US006963831B1

(12) United States Patent
Epstein

(10) Patent No.: US 6,963,831 B1
(45) Date of Patent: Nov. 8, 2005

(54) INCLUDING STATISTICAL NLU MODELS WITHIN A STATISTICAL PARSER

(75) Inventor: Mark E. Epstein, Katonah, NY (US)

(73) Assignee: International Business Machines Corporation, Armonk, NY (US)

(*) Notice: Subject to any disclaimer, the term of this patent is extended or adjusted under 35 U.S.C. 154(b) by 1074 days.

(21) Appl. No.: 09/696,803

(22) Filed: Oct. 25, 2000

(51) Int. Cl.[7] ............................................. G06F 17/20
(52) U.S. Cl. ......................................... 704/9; 704/270
(58) Field of Search ............................... 704/8, 9, 270, 704/260, 257, 10

(56) References Cited

U.S. PATENT DOCUMENTS

| | | | |
|---|---|---|---|
| 6,311,150 B1 * | 10/2001 | Ramaswamy et al. | 704/1 |
| 6,442,522 B1 * | 8/2002 | Carberry et al. | 704/257 |
| 6,446,040 B1 * | 9/2002 | Socher et al. | 704/260 |
| 6,529,871 B1 * | 3/2003 | Kanevsky et al. | 704/246 |
| 6,609,087 B1 * | 8/2003 | Miller et al. | 703/22 |
| 6,757,646 B2 * | 6/2004 | Marchisio | 704/8 |

OTHER PUBLICATIONS

Epstein, Mark et al., "Statistical NLU using Hidden Clumpings," ICAASP Proceedings v.1. p 176 (1996).*
Frederick Jelinek, *Statistical Methods For Speech Recognition*, at pp. 9, 147, and 219-243 (The MIT Press).
Jurafsky and Martin, *Speech and Language Processing*, at p. 22 (Prentice Hall, Upper Saddler River, New Jersey).

* cited by examiner

*Primary Examiner*—Susan McFadden
(74) *Attorney, Agent, or Firm*—Akerman Senterfitt

(57) ABSTRACT

A method and system for statistical parsing. The method involves a series of steps. The system can apply a statistical natural language understanding (NLU) model to test input for identifying substrings within the text input. The statistical NLU model can be selected for identifying a particular class of substring. The system can examine each identified substring using an inventory of queries corresponding to the reusable statistical NLU model.

35 Claims, 3 Drawing Sheets

INCLUDING STATISTICAL NLU MODELS WITHIN A STATISTICAL PARSER

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of natural language understanding (NLU), and more particularly, to including statistical NLU models within a statistical parser.

2. Description of the Related Art

NLU systems enable computers to understand and extract information from human written or spoken language. Such systems can function in a complimentary manner with a variety of other computer applications where there exists a need to understand human language. NLU systems can extract relevant information contained within text and then supply this information to another application program or system for purposes such as booking flight reservations, finding documents, or summarizing text.

Currently within the art, either a grammatical approach or a statistical approach can be used for NLU. Within the statistical approach, three algorithms, statistical parsing, maximum entropy models, and source channel models can be used for examining text in order to extract information. Statistical parsers can utilize phrases identified by one or more statistical phrase models as queries which then can be ordered as a decision tree. Maximum entropy models can use the preprocessed phrases as features which can be assigned weights. To function efficiently, NLU systems must first be trained to correctly parse future text inputs. The training process involves supplying the NLU system with a large quantity of annotated text, referred to as a training corpus. By examining the annotated training corpus, statistical models can be constructed which learn to parse future text.

presently such systems can require thousands of sentences of training data. One alternative is to use the Monte Carlo method of generating a large number of sentences. The Monte Carlo method can produce randomly generated text or sentences for use as a training corpus. Using the Monte Carlo method, the NLU system can be statistically trained by generating many possible permutations of conflict situations. A conflict situation is where a word can be construed by the NLU system as belonging to more than one phrase. From the large amount of training data, the NLU system can build a decision tree to analyze text strings and resolve conflict situations. Decision trees use a series of successive, ordered queries to determine the meaning of a sentence. For example, the NLU system can examine a text string on a word by word basis. At each word within the text string, the NLU system can determine the word on either side of the current word to make a determination as to the meaning of the text string. Additional examples of queries can include "what is the word two words to the left of the current word?" or "what is the word two words to the right of the current word?"

Unfortunately, the above described statistical approach can have disadvantages. One disadvantage is that the Monte Carlo method itself takes time to generate a training corpus from which the NLU system can be trained. Moreover, the Monte Carlo method necessarily generates a large amount of training data. For example, from the text input "I want to fly on Monday, Dec. 4, 2000", the Monte Carlo method can generate the following text strings: "I want to fly on Tuesday, Dec. 5, 2000", "I want to fly on Wednesday, Dec. 6, 2000", and "I want to fly on Monday, Dec. 3, 2001". The Monte Carlo method also can generate different training sentences where only the date syntax differs within each sentence. The possible permutations, each of which is equally likely to occur, can be virtually limitless. Continuing this method for the number of iterations necessary to train the NLU system to recognize different, but equally likely, dates and syntaxes can become inefficient and time consuming. Another disadvantage to present statistical approaches is that once the training data has been generated, that training data must also be annotated for grammatical phrases and words. Finally, each time an NLU application is built, enough training data must be collected and annotated so that the model parameters can be trained. Thus, training each NLU application can be inefficient and time consuming, as well as redundant.

Grammatical approaches to NLU can have disadvantages as well. The grammatical approach to NLU incorporates grammars for recognizing text strings. Notably, the grammars used within NLU systems tend to be application specific, and thus, difficult to reuse across multiple applications. Another disadvantage to grammars can be the need for linguistic experts to develop suitable grammars for an NLU application. Use of linguistic experts can significantly impact NLU application development due to the extra developmental step and the added cost.

SUMMARY OF THE INVENTION

The invention concerns a method and a system for including statistical NLU models within a statistical parser, a maximum entropy parser, or a direct channel model. The inventive method taught herein can begin by applying a statistical natural language understanding (NLU) model to text input for identifying substrings within the text input. The statistical NLU model can be selected for identifying a particular class of substring. The method can include examining the identified substrings using an inventory of queries or features corresponding to the selected statistical NLU model. Additionally, the inventory of queries can have a hierarchy or be given weights determined during training of an NLU system.

In one embodiment, an inventory of queries, hierarchically ordered into a decision tree, can be used in a statistical parser. In another embodiment of the invention, a statistical maximum entropy parser can use queries related to statistical NLU models. In that case, the queries can have weights rather than be ordered in a decision tree.

The step of applying a statistical NLU model further can include comparing a probability value, which corresponds to the identified substring, to a threshold probability value, which corresponds to the selected statistical NLU model.

Another embodiment of the invention can include iteratively applying different selected statistical NLU models to the text input. The selected statistical NLU model can be a maximum entropy direct channel model, a source-channel model trained by the expectation maximization (EM) algorithm, an n-gram model such as a bigram or a trigram, a statistical parser, or a word spotter. The step of applying a statistical NLU model can include identifying a parse tree which corresponds to each identified possible substring.

Another embodiment of the invention can be a maximum entropy parsing method for statistically parsing text where the method can begin by applying a statistical NLU model to test input for identifying substrings within the text input. The statistical NLU model can be selected for identifying a particular class of substring. The method can include examining the identified substrings using one or more features corresponding to the selected statistical NLU model. Additionally, the features can have weights determined during training of an NLU system.

The step of applying a statistical NLU model further can include comparing a probability value, which corresponds to the identified substring, to a threshold probability value, which corresponds to the selected statistical NLU model.

Another embodiment of the invention can include iteratively applying different selected statistical NLU models to the text input. The selected statistical NLU model can be a maximum entropy direct channel model, a source-channel model trained by the EM algorithm, an n-gram model such as a bigram or a trigram, a statistical parser, or a word spotter. The step of applying a statistical NLU model can include identifying a parse tree which corresponds to each identified possible substring.

Another embodiment of the invention can be a direct channel method for determining a meaning for a text input. The method can include applying a statistical NLU model to a test input and identifying one or more substrings within the text input. Each substring can correspond to the statistical NLU model. The substrings further can identify the text input as a particular category of text input. Additionally, the method can include determining a meaning for the text input based upon the identified substrings from possible meanings within the statistical NLU model. The determining step also can include applying weighted features corresponding to the identified substrings to the text input. The additional step of comparing a probability value corresponding to each substring to one or more threshold probability values within the statistical NLU model can be included. Further, the method can include iteratively applying different selected statistical NLU models to the text input. Notably, the NLU model can be a maximum entropy direct channel model, a source-channel model trained by the expectation maximization algorithm, a n-gram model, a statistical parser, or a word spotter.

A second aspect of the invention can be a statistical parsing system. The system of the invention can include a text buffer for storing text input, and at least one statistical NLU model for recognizing a substring within the text input. Additionally, the system can include an inventory of queries where each query within the inventory of queries can correspond to one of the statistical NLU models. Notably, the inventory of queries can have a hierarchy determined during training of an NLU system.

The statistical NLU model within the statistical parsing system can include a threshold probability value for comparing the recognized substrings to the threshold probability value. The statistical NLU model can be a maximum entropy direct channel model, a source-channel model trained by the EM algorithm, an n-gram model such as a bigram or trigram, a statistical parser, or a word spotter. Also, the statistical NLU model can identify a parse tree corresponding to each substring recognized within the text input.

In another embodiment of the invention, the system of the invention can include a text buffer for storing text input, and at least one statistical NLU model for recognizing a substring within the text input. Additionally, the system can include one or more features where each feature can correspond to one of the statistical NLU models. Notably, the features can have weights determined during training of an NLU system.

The statistical NLU model within the statistical parsing system can include a threshold probability value for comparing the recognized substrings to the threshold probability value. The statistical NLU model can be a maximum entropy direct channel model, a source-channel model trained by the EM algorithm, an n-gram model such as a bigram or trigram, a statistical parser, or a word spotter. Also, the statistical NLU model can identify a parse tree corresponding to each grammatical phrase recognized within the text input.

A third aspect of the invention can be a machine readable storage, having stored thereon a computer program having a plurality of code sections executable by a machine for causing the machine to perform a series of steps. The steps can include applying a statistical NLU model to text input for identifying substrings within the text input. The statistical NLU model can be selected for identifying a particular class of substring. The machine readable storage can cause the machine to examine each identified substring using an inventory of queries corresponding to the selected statistical NLU model. The inventory of queries can have a hierarchy determined during training of an NLU system.

Another embodiment of the invention can include additional code sections executable by a machine for causing the machine to perform the additional step of iteratively applying different selected statistical NLU models to the text input.

Another embodiment of the invention can be a machine readable storage, having stored thereon a computer program having a plurality of code sections executable by a machine for causing the machine to perform a series of steps. The steps can include applying a statistical NLU model to text input for identifying substrings within the text input. The statistical NLU model can be selected for identifying a particular class of substring. The machine readable storage can cause the machine to examine each identified substring using one or more features corresponding to the selected statistical NLU model. Each feature can have a weight determined during training of an NLU system.

Another embodiment of the invention can include additional code sections executable by a machine for causing the machine to perform the additional step of iteratively applying different selected statistical NLU models to the text input.

Another embodiment of the invention can be a machine readable storage, having stored thereon a computer program having a plurality of code sections executable by a machine for causing the machine to perform a series of steps. The steps can include applying a statistical NLU model to a text input and identifying one or more substrings within the text input. Each substring can correspond to the statistical NLU model. Additionally, the substrings can identify the text input as a particular category of text input. The additional step of determining a meaning for the text input based upon the identified substrings from possible meanings within the statistical NLU model can be included. The determining step can include applying weighted features corresponding to the identified substrings to the text input.

Additional code sections for causing the machine to perform the step of comparing a probability value corresponding to each substring to one or more threshold probability values within the statistical NLU model can be included. Further, the step of iteratively applying different selected statistical NLU models to the text input can be included.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Figure 1:
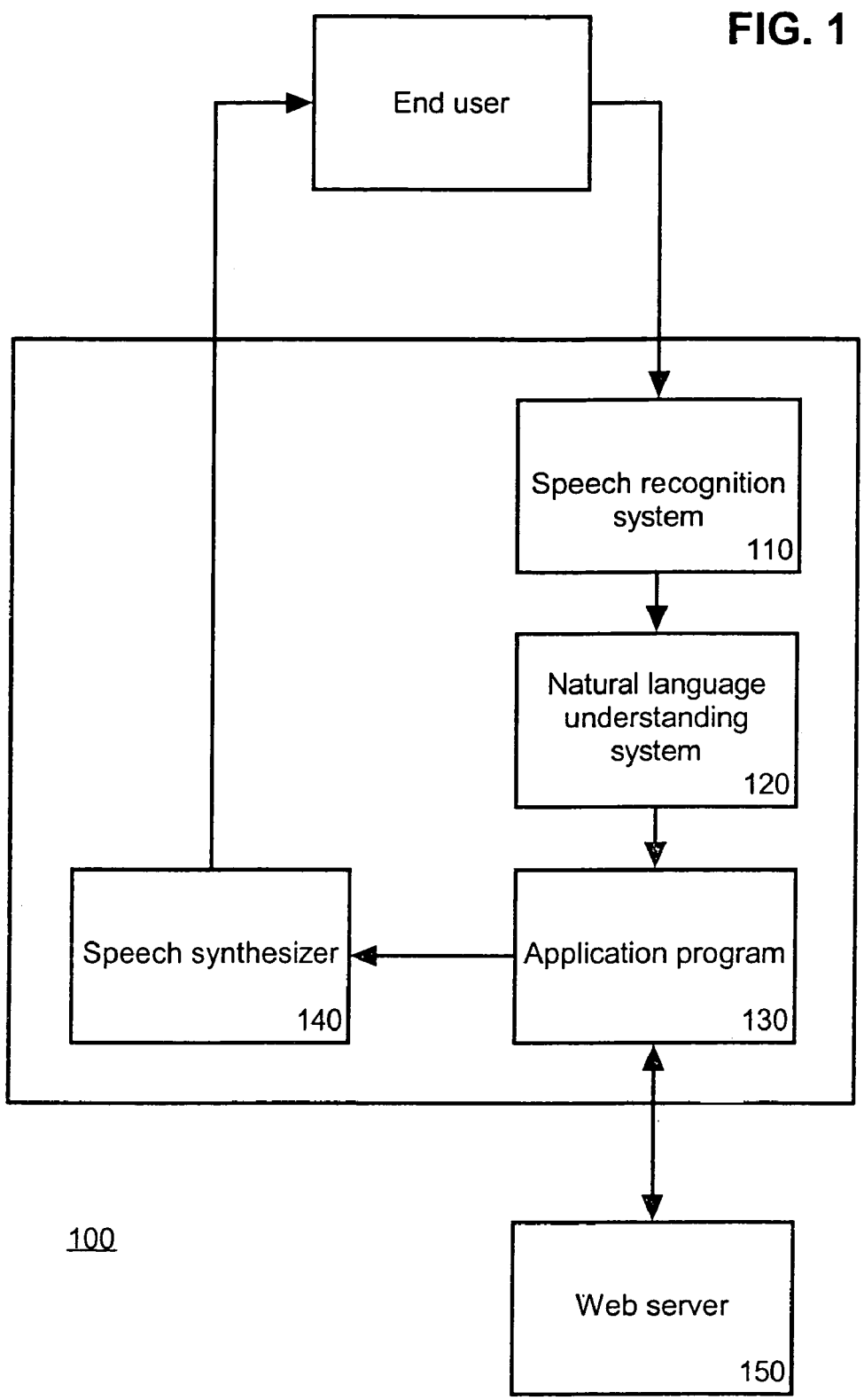
FIG. 1 depicts an exemplary configuration utilizing the system of the invention.

The invention disclosed herein concerns a method and system for including reusable statistical natural language understanding (NLU) models within a statistical parser or maximum entropy model for use with an NLU system. The system of the invention includes parsing a text string into each possible substring using a reusable statistical NLU model, where a substring can be any word or grouping of words within a larger body of text. For example, a text string having n words can have [n*(n+1)]/2 possible substrings. Each of the substrings can be processed using a reusable statistical NLU model. The substrings further can belong to a particular class of substrings such as dates, times, percentages, grammatical phrases, and subphrases such as "can I have" or "may I please". A reusable statistical NLU model can include, but is not limited to, an n-gram based model, a maximum entropy direct-channel model, a source-channel model trained using the expectation maximization (EM) algorithm, a word spotter, or any suitable statistical model for understanding human language. Notably, the aforementioned statistical models and algorithms are commonly known in the art of NLU and speech recognition. Further, the process of the invention can be iterative in that a different reusable statistical NLU model can be applied to the test string during each subsequent iteration.

The system additionally can return the parse tree for each possible substring identified by the corresponding reusable statistical NLU model capable of producing parse trees. The parse tree of a text string can be comprised of non-terminals, representing grammatical phrases such as noun or verb phrases, and terminals, representing words. The NLU system can examine parse trees for identification of particular word groupings, non-terminals, terminals, or other grammatical phrases. The terminals and non-terminals form a set of grammatical rules, which can be represented in Backus-Naur Form (BNF). Rather than denoting the rules as a system of equations, the rules can be depicted in graphical form. In this form, as a parse tree, the left-hand term of the highest level rule used to identify the text string serves as a root. More detailed rules can lie beneath the root, where each left-hand side of a rule can serve as a node of the parse tree. Thus, the root can be "S" where the next level nodes beneath "S" are "NP" and "VP" denoting that the sentence or text string includes a noun phrase and a verb phrase. The parse tree can continue until the terminal level is reached, forming the leaves of the parse tree.

It should be appreciated that the system of the invention can be realized using statistical NLU models which do not produce parse trees, such as a word spotter. In that case, no parse tree is produced by the NLU system, rather, the NLU system can search and identify instances of particular keywords within text.

Each reusable statistical NLU model can identify substrings in the input text with probabilities. These probabilities can be trained by using a training corpus to learn the parameters of the reusable model. Notably, the probabilities can be heuristically assigned weights by the designer. Regardless of the probabilities the reusable model assigns to substrings in the input text, features or queries can be defined which examine these substrings only if their probabilities exceed a specific threshold. The importance of the queries or features can be determined by examining a training corpus of text and meanings or annotated parse trees. Based on one modeling technique, known as decision trees, the queries can be hierarchically ordered. In another modeling technique, known as maximum entropy modeling, the features can be assigned weights by the generalized iterative scaling algorithm. By using many different queries or features with different weights, the NLU system can build a model which utilizes the output of the reusable models, thereby allowing the statistical parser, maximum entropy parser, or direct channel model to use significantly less training data and time for training. In addition, the reusable NLU models can be changed without requiring the NLU system to be retrained.

Notably, the threshold probability value can be determined by the NLU system during training. For example, the system can define the threshold probability value as the average component probability value of all components comprising the reusable statistical NLU model. It should be appreciated that the threshold probability value can be determined through other statistical methods such as the median value of component probability values determined within a particular reusable statistical NLU model. Another embodiment can utilize proprogrammed component and threshold probability values, each of which can be an administrable parameter within the NLU system.

Each identified possible substring and parse tree can be examined using an inventory of queries. The inventory of queries can contain queries relating to the reusable statistical NLU model applied to the text string, where constituents are word groupings. For example, a constituent can be a word grouping contained within a statistical model as a non-terminal. Thus, queries can be directed at whether a word or group of words matches a constituent within a statistical model. Examples of queries can include:

Does the current word of the identified substring begin a constituent in the set of parses found by the reusable statistical NLU model?

Does the current word of the substring end a constituent in the set of parses found by the reusable statistical NLU model?

Using statistical processing methods known in the art, such as minimizing the conditional entropy, or maximizing the likelihood that the resulting model predicts the training data, the inventory of queries can be ordered to form a decision tree. In this manner reusable statistical NLU models can be included into a statistical parser.

Queries can be directed at the terminal level or at the non-terminal level. For example, "is the current word under examination contained within a non-terminal of a particular reusable statistical NLU model". Another example of a query can be "does the current word begin a substring in the set of parses found by the reusable statistical NLU model?"

Using statistical processing methods known in the art, the inventory of queries can be ordered to form a decision tree during training of the NLU system. In this manner reusable statistical models can be included into an NLU system to significantly reduce the amount of training data and time required to properly train an NLU system. In addition, the grammar can later be changed without requiring the system to be retrained.

The NLU system can determine a hierarchy of the queries contained within the inventory of queries during training using an annotated training corpus. Using statistical processing algorithms known in the art, such as minimizing the conditional entropy or maximizing the likelihood that the resulting model predicts the training data, the NLU system can determine the most efficient and effective ordering of queries. In this manner a hierarchy of queries within the inventory of queries, referred to as a decision tree, capable of recognizing substrings, can be determined. Notably, the inventory of queries can include queries directed to reusable statistical NLU models, and to particular word and word groupings within a text string.

A positive result to one query can render another query or set of queries moot, yet other queries can become highly relevant. For example, if a word is identified as the left most constituent being built, then the NLU system need not query further to determine words further to the left within the text string. Accordingly, the NLU system, for example, can query to determine the right most word of the constituent being built. Thus, an analysis of the queries and results on the training corpus can determine the resulting decision tree. This decision tree is then used at runtime to statistically provide a probability distribution for possible parse trees.

In another embodiment, known as maximum entropy modeling, each query is called a "feature", and all features can have weights, which are determined by an algorithm known as generalized iterative scaling. This assigns higher weights according to the utility of a feature. Similar to the hierarchy of queries, the weights of each feature can be determined during training of the NLU system. Specifically, analysis of the annotated training corpus with regard to the features can determine the resulting weights of the features, just as relative importance of queries can be determined. Thus, the determined weights used with the maximum entropy model can be used instead of a decision tree. The resulting model can be called a maximum entropy parser.

The reusable statistical NLU models can be smaller, more specific models for identifying particular substrings rather than for an entire language. For example, the NLU system can contain individual reusable statistical NLU models for dates, times, prices, dollar amounts, percentages, and subphrases including prefix expressions such as "can I have" or "please pass me", and other expressions. Inclusion of reusable statistical NLU models can significantly reduce the amount of training data and time required to properly train the NLU system. For example, the NLU system need not be retrained to detect text strings such as dates or times for which the NLU system contains a reusable model. Notably, the NLU system can function more efficiently and accurately because the reusable statistical NLU models can be continually refined and updated.

In another embodiment, known as direct channel modeling, the NLU system can examine an entire sentence to determine a meaning. The NLU system can check the text input for the occurrence of particular elements of reusable statistical NLU models. For example, the elements can be weighted features for a maximum entropy approach, n-grams having probabilities, keywords for a word spotter approach. Notably, a statistical parser can be used within the NLU system. The presence of particular elements or keywords can indicate a general category of meaning for the text input. For example, the text input can relate to meanings corresponding to airline flight information. Thus, out of several general categories of text inputs, the NLU system can recognize the text input as pertaining to flight information, rather than hotel or rental car information. Consequently, the NLU system can search for the presence of more specific arguments, such as times and locations, which relate to flight information which also correspond to elements of the reusable statistical model used. By identifying elements corresponding to arguments, moving from the general to the specific, the NLU system can search for a meaning of the English sentence, rather than searching for the presence of all elements of a reusable statistical NLU model within a text input. In this manner, the NLU system directly determines a meaning for the text input without statistically parsing the sentence.

It should be appreciated that a category of text input can be any type of text input expected by an NLU system, and the invention is not so limited by the specific examples described herein. For example, a NLU system for use with a travel agency can recognize categories by vacation type, i.e., a cruise, land tour, or biking tour. An NLU system for use with an airline can recognize air travel as a category and booking rental cars as a separate category.

FIG. 1 depicts an exemplary system 100 containing speech recognition system (SRS) 110, NLU system 120, application program 130, speech synthesizer 140, and optionally a web server 150 for implementation on the Internet or other computer communications network. System 100 can be any system which requires an understanding of, or an extraction of information from human language. Examples of such systems can include, but are not limited to, automated reservation systems and automated help desks. Notably, NLU system 120 functions as an element of system 100.

In exemplary system 100, speech recognition system (SRS) 110, NLU system 120, application program 130, and speech synthesizer 140 can be computer programs written in C or another suitable programming language. The computer programs can be contained within a computer system equipped with the necessary hardware, i.e., audio circuitry (sound card) and modem, to perform speech recognition and speech synthesis functions. The various hardware requirements for the computer system as described herein can generally be satisfied by any one of many commercially available high speed multimedia personal computers offered by manufacturers such as International Business Machines Corporation.

In operation, an end user can initiate a communications session with system 100 through a conventional communications link. More specifically, the communications link can be a data connection through a computer communications network, the Internet, or a voice connection via telephone. For example, with the latter instance, the end user may contact system 100 by dialing a service telephone number and initiating voice communication with system 100. In response, system 100 can answer the end user's telephone call and provide service options through a prerecorded message or through speech synthesizer 140. For example, system 100 can instruct the end user as follows: "Say 'customer service' to speak with a service agent, say 'reservations' to make flight reservations."

Subsequently, the end user makes a selection by uttering into a telephone handset the appropriate phrase corresponding to the end user's desired selection. User spoken utterances delivered to system 100 through the telephone connection can be received by speech recognition system (SRS) 110 and converted to computer-recognizable text for further processing. SRSs are well known in the art and are commercially available from manufacturers such as International Business Machines Corporations.

Once a user spoken utterance has been converted to text by the SRS 110, the SRS can further provide the resulting text representation of the user spoken utterance to the NLU system 120. From the text representation of the user spoken utterance, the NLU system 120 can process the received text to extract information required by application program 130. For example, required information within a flight reservation system can be text or phrases, including both noun and verb phrases, indicating a desire to fly, the destination, and arrival and departure dates and times.

NLU system 120 can include one or more reusable statistical NLU models for identifying possible substrings within a text input. Notably, the reusable statistical NLU models can be smaller, more specific models for identifying particular classes of substrings rather than for an entire language. For example, the NLU system can contain individual reusable statistical NLU models for dates, times, prices, dollar amounts, percentages, and subphrases including prefix expressions such as "can I have" or "please pass me", and other expressions.

Following the extraction of the information by the NLU system 120, the NLU system 120 can provide the information to the application program 130. Subsequently, the application program 130 can make use of the information as required. Specifically, after determining whether the user requested information is available or whether the user requested function can be performed, the application program 130 can provide feedback information to the end user through speech synthesizer 140 via telephone.

Figure 2:
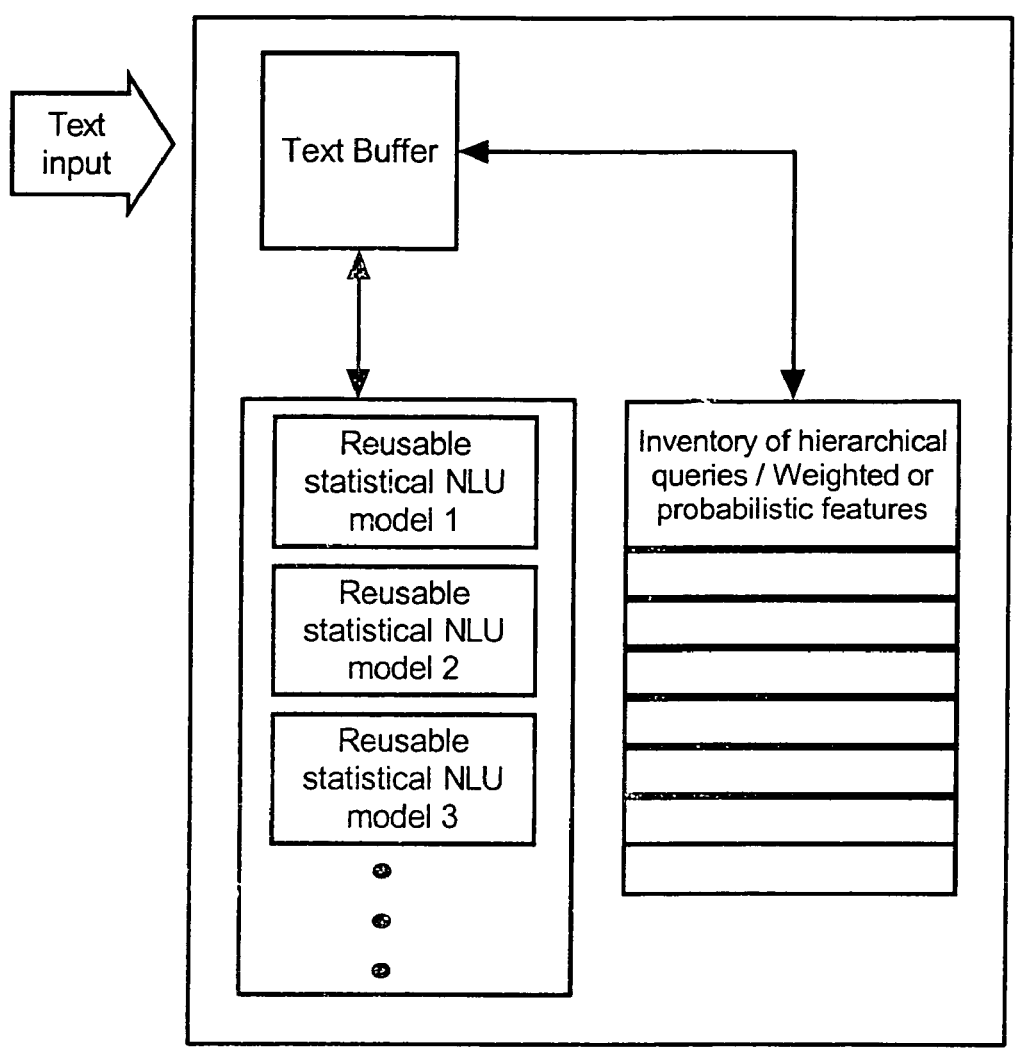
FIG. 2 is a schematic diagram illustrating an exemplary system for recognizing substrings within a text input.

An NLU system 120 in accordance with the inventive arrangements is shown in FIG. 2. The system can include a text buffer for receiving a text input to be processed. NLU system 120 also can include one or more reusable statistical NLU models, as previously described, each capable of recognizing particular text strings within a body of text such as dates, times, percentages, dollar amounts, prices, and subphrases. Also included can be an inventory of queries. The queries contained within the inventory of queries can correspond to one or more of the reusable statistical NLU models within NLU system 120.

Figure 3:
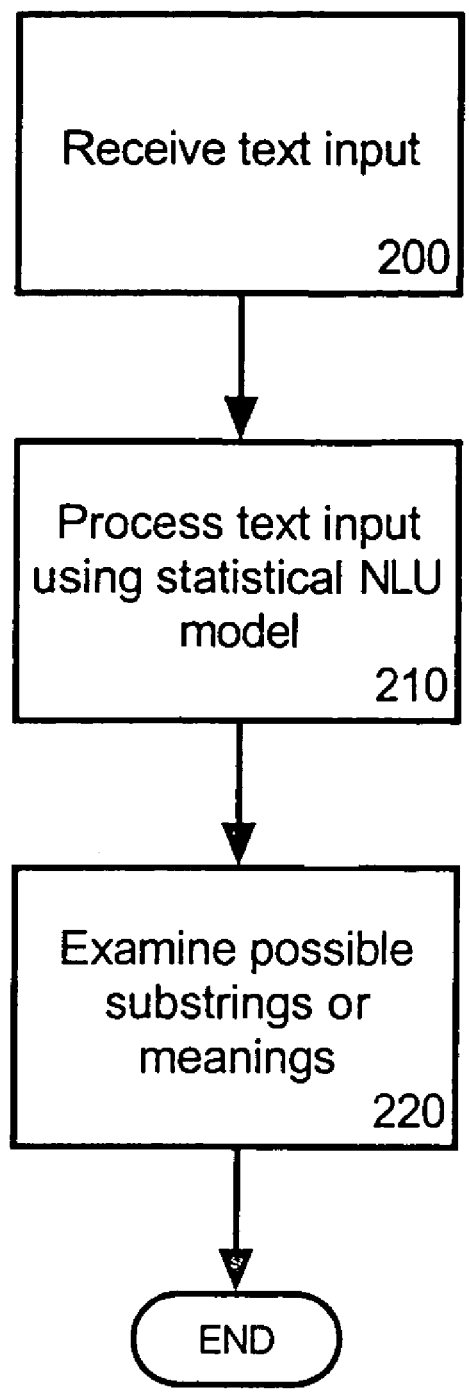
FIG. 3 is a flow chart illustrating a process for including statistical NLU models within a statistical parser.

FIG. 3 is a flow chart illustrating a process for including reusable statistical NLU models within a statistical parser, a maximum entropy parser, or a direct channel model as performed by the NLU system 120 of FIG. 1. The NLU system can operate upon a text input to supply structure to the text. For example, the structure can be a phrase structure analysis such as determining non-terminals, whole parse trees, or extracting keywords from the text input. According to one embodiment of the invention, the NLU system is placed in a mode awaiting a text input from an end user for processing. Beginning at step 200, the NLU system receives a text input for processing.

In step 210, the NLU system can process the text input using a reusable statistical NLU model. For example, within a text string of n words, there are $[n*(n+1)]/2$ possible substrings. Each of these substrings can be processed by the reusable statistical NLU model, where the NLU system can search for word groupings, terminals, or non-terminals defined within the reusable statistical NLU model. The reusable statistical NLU model can be an n-gram model, a bigram model, a maximum entropy direct-channel model, a source-channel model trained using the EM algorithm, a statistical parser, or a word spotter. Notably, each of the aforementioned models is known in the art of NLU and speech recognition as described in The MIT Press, Cambridge Mass., Frederick Jelinek, *Statistical Methods for Speech Recognition,* at pp. 9, 147, and 219–43; and Prentice Hall, Upper Saddle River, N.J., Jurafsky and Martin, *Speech and Language Processing,* p. 22, each of which is incorporated herein by reference. Using the reusable statistical NLU model, the processing can return each possible substring from the text input which corresponds to the particular class of substring to which the statistical NLU model is directed. Also, each reusable statistical model can include tags for annotating non-terminals and terminals. Thus, a trigram can be annotated as a non-terminal, while the three words comprising the trigram can be annotated as terminals.

For example, in one embodiment, a word spotter can be the reusable statistical NLU model. An exemplary implementation of a word spotter can be the SED or GREP tools using Regular Expressions implemented within the UNIX operating system. The word spotter can be programmed to search for a series of keywords denoting dates, such as the months of the year or numbers. Thus, the word spotter can be programmed to return all possible substrings containing a month or number from a text input. Alternatively, the word spotter can be programmed to return an entire sentence containing a month or number. In either case, the model can include a threshold probability value. Also, each keyword within the model can be assigned a probability value during training. Thus, in operation, the NLU system can return only substrings or words containing a keyword having a probability value greater than the threshold probability value.

For example, each possible substring of the text input "I want to fly the 4th of December in 2001" can be processed using a word spotter having months and numbers as keywords. The word spotter can return only possible substrings containing the keywords. Thus, exemplary substrings can include "4th of December", "December in 2001", and "4th of December in 2001". In this manner, the exemplary processing can yield each possible substring derived from applying the reusable statistical NLU model to the input text. In other words, by applying a date directed reusable statistical NLU model to the input text, the NLU system can extract each possible substring of text representing dates. Notably, if the reusable statistical NLU model can determine parse trees, then the processing also can return each substring's corresponding parse tree.

Another exemplary reusable statistical model can be based upon an n-gram model, where n can be any suitable number of terminals. Examples of n-gram models can include, but are not limited to, unigrams, bigrams, and trigrams. For example, a text input can be parsed into each possible substring and scored with a trigram model. Similar to the word spotter model, a trigram model also can include a threshold probability value such that only substrings having a trigram model probability value greater than the threshold probability value are returned from the text input.

It should be appreciated that an NLU system can contain different statistical reusable NLU models, each tailored to a specific class of subphrase. For example, the NLU system can include a reusable statistical NLU model directed to the representation of dates. Such a model can enable the NLU system to recognize various syntaxes expressing dates. More specifically, the reusable statistical NLU model can recognize each of the following examples as dates, though the syntax of each is different: "December 4, 2001", "12/4/

2001", "4/12/2001" (DD/MM/YYYY), and "4th of December, 2001". Thus, the NLU system can contain specifically tailored reusable statistical NLU models directed at extracting expressions such as time, price, dollar amounts, percentages, and subphrases. Using this approach, the NLU system can undergo multiple iterations, applying a different reusable statistical NLU model during each subsequent iteration. For example, by applying a reusable statistical NLU model for extracting time substrings, each possible time substring within the input text can be extracted. A subsequent iteration can apply a percentage directed reusable statistical NLU model to extract each possible percentage substring. Notably, the ordering of the application of reusable statistical NLU models can be determined by reference to a table of reusable statistical NLU models and corresponding classes of substrings stored within the NLU system. In this manner the NLU system can achieve increased accuracy. After completion of step 210, the system can continue to step 220.

In step 220, the resulting substrings can be examined using an inventory of queries or features relating to the particular reusable statistical NLU model used to extract each substring. Notably, if a corresponding parse tree was also determined, then the parse tree can be examined using an inventory of queries relating to the particular reusable statistical NLU model used to determine the parse tree. The queries can be directed at non-terminals such as verb phrases or other clauses. Also, the queries can be directed at terminals within non-terminals. In this case, the examination can proceed on a word by word basis. Example queries can include:

Does the current word begin a substring in the set of parses found by the reusable statistical NLU model?

Does the current word continue a parse tree found by the reusable statistical NLU model and does it continue the open constituent already started?

Does the current word continue a parse tree found by the reusable statistical NLU model and does it close the open constituent already started?

Does the constituent just created continue the current open constituent and is it allowed by the reusable statistical NLU model?

For example, by applying queries to the identified substring "December in 2001", the NLU system can determine that the substring can be part of an open constituent. Thus, to examine a parse tree, the NLU system can query to find what terminals and non-terminals also exist within the substring, along with their corresponding placement in the parse tree and substring. In the case where no parse tree is generated, the NLU system can query to find what word groupings or particular words exist within the substring, along with their corresponding placement. For example, the NLU system can determine that "4th of" is part of the date substring "December in 2001". Consequently, the NLU system can continue to apply queries from the inventory of queries to arrive at the valid date substring "4th of December in 2001", the date substring actually intended by the end user.

In an embodiment utilizing n-grams, trigrams for example, as the reusable statistical NLU model of step 210, then the system can query for the placement and existence of particular trigrams and words within a text string. For example, within "4th of December in 2001" the NLU system can determine that the entire text phrase represents a date. Using a trigram or other n-gram model, the NLU system can determine the probability that "4th" is the beginning of a date. Similarly, the NLU system can determine the probability that "of" is the second word of a date. The NLU system can continue this process for each word within the identified substring using a trigram model. In this manner, the NLU system can determine an overall score that any of the $n*(n+1)/2$ phrases is a date. Thus, the NLU system can query not only whether "December" can be found within a substring or trigram, but also determine the location of "December" within the substring and trigram model.

In an embodiment where the NLU system uses a maximum entropy model, each query, referred to as a feature, can be assigned a weight through examination of a training corpus. A sentence can be examined for the presence of particular features. Text strings identified as having particular features, for example containing a number of beginning or ending with a particular word, can be scored. The weights of the features present in the text string can be multiplied together to yield an overall score. Thus, rather than using a hierarchy of queries where some queries are of greater significance in a decision tree format, the NLU system can detect features having larger weights prior to detecting lesser weighted features. Specifically, the weights of features can correspond to the importance of a query. Notably, the weights, and thus the ordering of the detection of features, can be determined during training using the annotated training corpus. It should be appreciated that each method, using an inventory of queries or using the maximum entropy model, can statistically provide a probability distribution for possible parse trees at runtime.

Notably, the method of the invention disclosed herein requires a significantly smaller amount of training data to train a NLU system than other known methods. Accordingly, a smaller amount of training data can be annotated. Further, the invention need not employ the Monte Carlo method. Using a well designed inventory of queries, a reusable statistical NLU model, and a minimal amount of training data, a statistical parser can learn at training time which combination of queries or features is most effective for statistical models to learn embedded text phrases.

The present invention can be realized in hardware, software, or a combination of hardware and software. A method and system for including reusable statistical NLU models within a statistical parser according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A statistical parsing method comprising:

applying at least one statistical natural language understanding (NLU) model to text input for identifying substrings within said text input, said statistical NLU model belonging to a group of one or more statistical NLU models included within a statistical parser and selected for identifying a particular class of substring; and, examining said each identified substring using an inventory of queries corresponding to said selected statistical NLU model.

2. The method of claim 1, further comprising iteratively applying different selected statistical NLU models to said text input.

3. The method of claim 1, wherein said step of applying a statistical NLU model further includes comparing a probability value, which corresponds to said identified substrings, to a threshold probability value, which corresponds to said selected statistical NLU model.

4. The method of claim 1, wherein said selected statistical NLU model comprises a maximum entropy direct channel model, a source-channel model trained by the expectation maximization algorithm, a n-gram model, a statistical parser, or a word spotter.

5. The method of claim 1, wherein said step of applying a statistical NLU model further comprises identifying a parse tree which corresponds to each said identified substring.

6. The method of claim 1, said inventory of queries having a hierarchy determined during training of an NLU system.

7. A maximum entropy parsing method comprising:

applying at least one statistical natural language understanding (NLU) model to text input for identifying substrings within said text input, said statistical NLU model belonging to a group of one or more statistical NLU models included within a maximum entropy parser and selected for identifying a particular class of substring; and, examining each said possible substring using one or more features corresponding to said selected statistical NLU model.

8. The method of claim 7, further comprising iteratively applying different selected statistical NLU models to said text input.

9. The method of claim 7, wherein said step of applying a statistical NLU model further includes comparing a probability value, which corresponds to said identified substrings, to a threshold probability value, which corresponds to said selected statistical NLU model.

10. The method of claim 7, wherein said selected statistical NLU model comprises a maximum entropy direct channel model, a source-channel model trained by the expectation maximization algorithm, an n-gram model, a statistical parser, or a word spotter.

11. The method of claim 7, wherein said step of applying a statistical NLU model further comprises identifying a parse tree which corresponds to each said identified substring.

12. The method of claim 7, said features having weights determined during training of an NLU system.

13. A statistical parsing system comprising:

a text buffer for storing text input;

at least one statistical NLU model included within a statistical parser for recognizing a substring within said text input; and, an inventory of queries wherein each query within said inventory of queries corresponds to one of said at least one statistical NLU models.

14. The system of claim 13, wherein said statistical NLU model includes a threshold probability value for comparing each said recognized substring to said threshold probability value.

15. The system of claim 13, wherein said statistical NLU model comprises a maximum entropy direct channel model, a source-channel model trained by the expectation maximization algorithm, an n-gram model, a statistical parser, or a word spotter.

16. The system of claim 13, wherein said statistical NLU model can identify a parse tree corresponding to each said recognized substring within said text input.

17. The system of claim 13, said inventory of queries having a hierarchy determined during training of an NLU system.

18. A statistical parsing system comprising:

a text buffer for storing text input;

at least one statistical NLU model embedded within a statistical parser for recognizing a substring within said text input; and, one or more features wherein each feature corresponds to one of said at least one statistical NLU models.

19. The system of claim 18, wherein said statistical NLU model includes a threshold probability value for comparing each said recognized substring to said threshold probability value.

20. The system of claim 18, wherein said statistical NLU model comprises a maximum entropy direct channel model, a source-channel model trained by the expectation maximization algorithm, an n-gram model, a statistical parser, or a word spotter.

21. The system of claim 18, wherein said statistical NLU model can identify a parse tree corresponding to each said recognized substring within said text input.

22. The system of claim 18, each said feature having a weight determined during training of an NLU system.

23. A machine readable storage, having stored thereon a computer program having a plurality of code sections executable by a machine for causing the machine to perform the steps of:

applying at least one statistical natural language understanding (NLU) model to text input for identifying substrings within said text input, said statistical NLU model belonging to a group of one or more statistical NLU models embedded within a statistical parser and selected for identifying a particular class of substring; and, examining said each identified substring using an inventory of queries corresponding to said selected statistical NLU model.

24. The machine readable storage of claim 23, for causing the machine to perform the additional step of iteratively applying different selected statistical NLU models to said text input.

25. A machine readable storage, having stored thereon a computer program having a plurality of code sections executable by a machine for causing the machine to perform the steps of:

applying at least one statistical natural language understanding (NLU) model to text input for identifying substrings within said text input, said statistical NLU model belonging to a group of one or more statistical NLU models included within a statistical parser and selected for identifying a particular class of substring; and, examining each said possible substring using one or more features corresponding to said selected statistical NLU model.

26. The machine readable storage of claim 25, for causing the machine to perform the additional step of iteratively applying different selected statistical NLU models to said text input.

27. In a natural language understanding (NLU) system, a direct channel method for determining a meaning for a text input comprising:
  applying at least one statistical NLU model to a text input, said statistical NLU model belonging to a group of one or more statistical NLU models included within a direct channel model;
  identifying one or more substrings within said text input, each said substring corresponding to said statistical NLU model; and,
  determining a meaning for said text input based upon said identified substrings from possible meanings within said statistical NLU model.

28. The method of claim 27, further comprising:
  comparing a probability value corresponding to each said substring to one or more threshold probability values within said statistical NLU model.

29. The method of claim 27, further comprising iteratively applying different selected statistical NLU models to said text input.

30. The method of claim 27, wherein said NLU model comprises a maximum entropy direct channel model, a source-channel model trained by an expectation maximization algorithm, a n-gram model, a statistical parser, or a word spotter.

31. The method of claim 27 wherein said determining step comprises applying weighted features corresponding to said identified substrings to said text input.

32. A machine readable storage, having stored thereon a computer program having a plurality of code sections executable by a machine for causing the machine to perform the steps of:
  applying a statistical natural language understanding (NLU) model to a text input, said statistical NLU model belonging to a group of one or more statistical NLU models embedded within a statistical parser;
  identifying one or more substrings within said text input, each said substring corresponding to said statistical NLU model; and,
  determining a meaning for said text input based upon said identified substrings from possible meanings within said statistical NLU model.

33. The machine readable storage of claim 32, for causing the machine to perform the additional step of:
  comparing a probability value corresponding to each said substring to one or more threshold probability values within said statistical NLU model.

34. The machine readable storage of claim 32, for causing the machine to perform the additional step of:
  iteratively applying different selected statistical NLU models to said text input.

35. The machine readable storage of claim 32, wherein said determining step comprises applying weighted features corresponding to said identified substrings to said text input.

* * * * *